Oct. 21, 1952
G. D. MACARTHUR
2,614,453
OPACITY SENSING DEVICE
Filed July 14, 1948
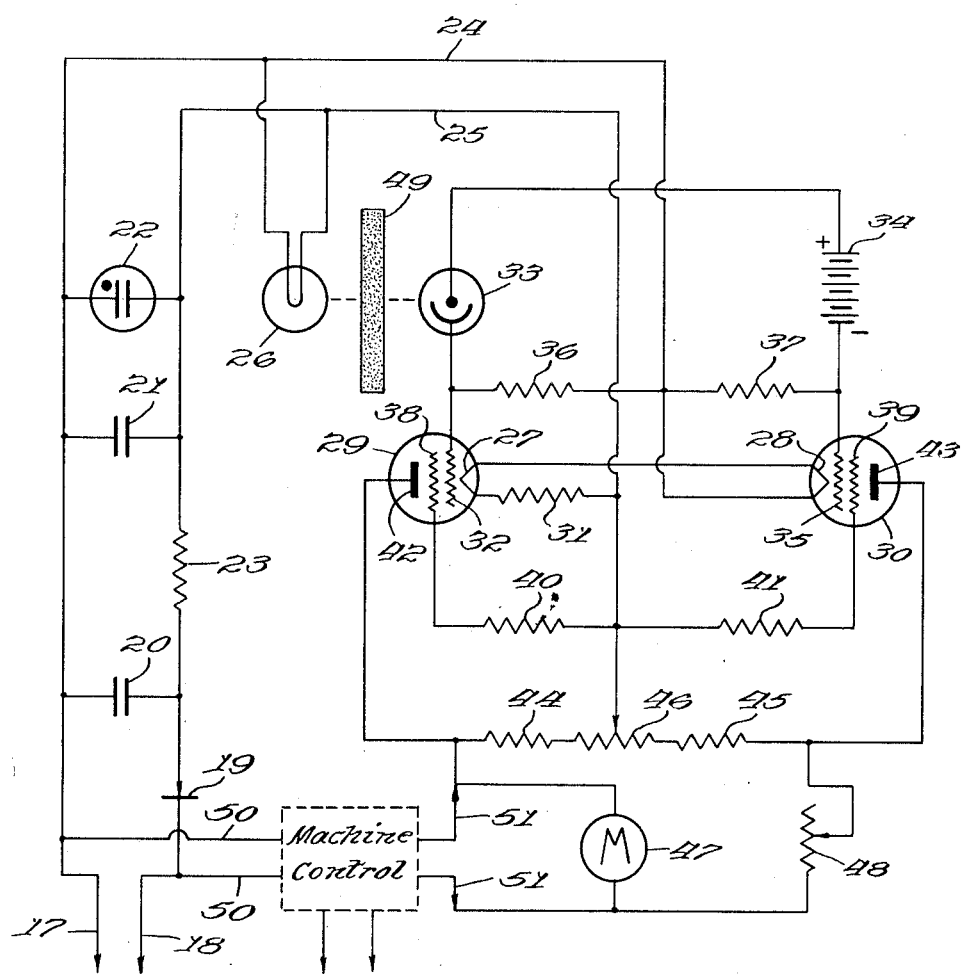
Inventor:
George D. MacArthur.
By Harold J. LeVesconte
Atty.

Patented Oct. 21, 1952

2,614,453

UNITED STATES PATENT OFFICE 2,614,453

OPACITY SENSING DEVICE

George D. Macarthur, Glendale, Calif.

Application July 14, 1948, Serial No. 38,699

11 Claims. (Cl. 88—14)

This invention relates to contact printing machines, of which blue print machines are an example, and particularly to a device for predetermining the opacity of the tracing or other material to be printed, so that the intensity of the light or the rate of travel of the machine may be regulated, either manually, or directly by the device, to produce a satisfactory print, without the necessity of trial and error procedure, with its attendant waste of both time and material. In the following specification, the terms "blue print" and "blue print machines" will be employed, but it will be understood that these terms are intended to include all similar apparatus for making contact type prints on sensitized materials and the prints made thereon.

The variety of tracing papers, vellums, cloths and other materials from which blue prints and other contact prints are made is almost endless, and the degrees of opacity are equally varied. Many papers, which to the naked eye, appear to be identical, are really of widely different degrees of opacity. In blue printing machines, especially those doing custom work, the operator has to guess at the opacity of the paper and then adjust the machine, according to that guess. If the resulting print is too light or too dark, the machine must be re-adjusted, and another print made with the attendant loss of operating time and waste of material.

Further, the ability to judge the proper speed and light conditions for each type of paper, vellum, or cloth by visual inspection, requires a highly skilled and correspondingly highly paid operator to operate the machine with minimum waste of time and material.

With the aforementioned problems in mind, it is an object of the invention to provide a means whereby the light conductive qualities of a paper, vellum, or cloth from which blue prints are to be made, may be accurately determined and values assigned thereto, which values may be translated into suitable adjustment of the speed or light of a blue print machine, so that uniform prints may be produced from widely varying opacities of paper or vellum.

Another object of the invention is to provide an electrically operated paper opacity determining means, constructed and arranged to give a reading in such terms that the machine may be adjusted to produce a satisfactory print.

Still another object of the invention, is to provide an accessory for use with blue print and similar machines, which is constructed and arranged to respond to different degrees of opacity in paper or vellum, from which prints are to be made, and by such response, to serve as a control for automatic adjustment of the speed or light or combination of both of the machine, whereby uniform prints may be obtained from successive tracings or the like, without attention to such adjustment by the operator, with elimination of the trial and error procedure heretofore necessary, to determine the correct adjustment.

A still further object of the invention is to provide a sensitive means for determining the density or opacity of paper, from which contact prints are to be made, employing an electrical bridge, including a pair of balanced thermionic tubes, whereby the sensitivity to small differences in opacity is increased.

Still another object of the invention is to provide an electrically operated, accurate opacity determining means, which may be operated from a source of 110 volt, alternating or direct current and in which variations due to fluctuations in line voltage are eliminated.

A still further object of the invention is to provide an opacity determining means for use in connection with contact printing machines, which is simple in construction, economical to manufacture and reliable in operation.

With the above objects in view, together with such other objects and advantages as may subsequently appear, the invention resides in the parts, and in the construction, combination and arrangement of parts hereinafter described and illustrated, by way of example, in the accompanying drawings in which there is shown a circuit diagram of a representative mode of execution of the invention, which is adapted to be operated by a source of either alternating or direct current; which possesses a great degree of sensitivity to opacity, and which, alternatively, may be employed as an opacity indicator or as an automatic control for adjusting means actuated either by the same or by a separate power source.

In the illustrated form of the invention, the power leads 17 and 18 are connected to a conventional rectifying filter unit, comprising a half wave rectifier 19, a pair of condensers 20 and 21, and a gas filled diode 22, serving as a voltage regulator; the condensers and diode being connected in parallel across the circuit with a resistance element 23, interposed between the condensers on the positive side thereof. This filter unit will convert alternating current received from a power source, into direct current, and will not interfere when the power source is direct current. The filter unit is connected by leads 24 and 25 with the sensing means, which will now be described.

The light source or lamp 26 is connected in parallel across the leads 24 and 25 as are also the filaments 27 and 28 of a pair of screen grid tubes 29 and 30 having a high transconductance; the filaments 27 and 28 being in series with each other and a resistance element 31 being interposed between the lead 25 and the filament 27 to control or limit the voltage of the filament current.

The control grid 32 of the tube 29 is connected to the cathode of the photoelectric cell 33 and the plate of this cell is connected to the positive side of a biasing battery 34; the negative side of which is connected to the control grid 35 of the tube 30. Grid resistors 36 and 37 connecting the grids 32 and 35 with the lead 25, are provided to limit the current supplied by the photocell, establishing the biasing voltage on the control grids. The screen grids 38 and 39 of these tubes are connected through the interposed resistors 40 and 41 to the lead 25 and the plates 42 and 43 with interposed resistors 44 and 45 are connected to the opposite ends of a potentiometer 46, the variable side of which is connected to the lead 25. A meter 47 is connected in parallel with the potentiometer 46 with a rheostat 48 connected in series with the meter to vary the proportion of current supplied thereto, and thus to vary the sensitivity of the meter.

It will be seen that the tubes 29 and 30, the photoelectric cell 33 and the potentiometer 46 are connected to form an electric bridge which can be brought into balance by appropriate adjustment of the potentiometer 46 in the same manner as the first described form of the invention, and that upon the interposition of a semi-transparent substance 49 such as a drawing paper between the light 26 and the cell 33, the bridge will be unbalanced with resultant different flows of current across the respective output legs of the bridge and indication of the amount of the current differential in the meter 47. It will be realized that if the resistors 40 and 41 were of the same value, the tubes 29 and 30 would be out of balance on exposure of the photocell 33 to the unobstructed light of the lamp. To overcome this, these resistors are so selected as to value that they overcome the bias differential on the control grids 32 and 35 at that time, so that the opposite sides of the bridge are in substantial balance. Due to the fact that the current is amplified by the tubes 29 and 30 the sensitivity of the bridge is correspondingly increased and differences in the opacity of paper that are indistinguishable to the eye will be indicated on the meter, so that appropriate adjustments may be made in the printing machine with assurance that the resulting print will have the desired contrast.

Thus, by the use of this device, contact printing machines may be operated by relatively unskilled help with increased production, due to the elimination of trial and error runs with the attendant waste of both time and material. Further all of the work will closely approximate a standard of uniformity, which is impossible to achieve by reliance on the judgment of even the most skilled operator.

While this form of opacity determining means may find its greatest use as an indicating adjunct to contact printing machines, it may also be employed as a direct control means for devices constructed and arranged to automatically adjust the speed, or the light, or both of the machine in response to the reaction of the light cell and bridge to the interposition of the paper to be printed between the light cell and lamp. To effect this control, power leads 50, 50 may be extended from the leads 17 and 18 to electronically controlled adjusting means, controlled by current flowing across the bridge circuit, represented by the leads 51, 51. Such adjusting means may take a number of forms, such as light intensity or rate of travel of the paper, depending on the type of adjustment desired in the machine.

It is particularly to be noted that the filter unit provides a stable voltage for the lamp, the filaments and the photocell cathode regardless of any variation in the power source voltage, above the maximum voltage permitted by the filter unit and that any drop in the power source voltage below the said maximum voltage will affect these elements uniformly so that the apparatus is free from interference by fluctuations in the line voltage. Modern, contact printing machines operated at relatively high speeds with intense lights and on a given type of tracing or the like, a slight difference in the speed of the machine, or in the intensity of the light, will mean the difference between a good print and one that is useless. The limiting factor in further speed of these machines is that they can be operated at no greater speed than will allow for a sufficiently wide margin of error within which the ability of an average operator to judge the correct adjustments of the machine from visual inspection of the character of the tracing paper, will produce reasonably uniform prints. With a more accurate determination of the speed and light requirements for each type of paper, the speed of the machine, and the intensity of the printing light can be still further increased, due to the fact that with more exact determination of the opacity of the paper, the previously necessary wide margin for errors of judgment may be limited without loss of uniformity in the prints obtained.

While I have described and illustrated one mode of execution of my invention, such description and illustration is by way of example only, and the invention includes all such modification of the parts, and of the construction, combination and arrangement of the parts and their equivalents, as shall come within the purview of the appended claims.

I claim:

1. In an apparatus for determining the opacity of a paper or the like material from which a contact print is to be made, means affording connection of said apparatus with a source of electrical energy including a pair of leads, a lamp, a photocell positioned in close proximity to said lamp, a pair of screen grid tubes, means connecting the filaments of said tubes in series with each other across said leads, means connecting the screen grids of said tubes in parallel with one of said leads, means connecting the control grids of said tubes in series with the anode and cathode of said photocell and with a biasing battery interposed between one of said control grids and the cathode of said photocell and other leads interconnecting the plates of said tubes forming the output legs of an electrical bridge; and resistors of different values interposed in series between said source of energy and each of said screen grids, said resistors being effective to hold said bridge in substantial balance when light from said lamp to said cell is unobstructed.

2. In an apparatus for determining the opacity of a paper or the like material from which a contact print is to be made, means affording connection of said apparatus with a source of electrical energy including a pair of leads, a lamp, a photocell positioned in close proximity to said lamp, a pair of screen grid tubes, means connecting the filaments of said tubes in series with each other across said leads, means connecting the screen grids of said tubes in parallel with one of said leads, other means connecting the control grids of said tubes in series with the anode and cathode of said photocell and with a biasing battery interposed between one of said controls and said cell, other leads interconnecting the plates of said tubes to form the output legs of an electrical bridge, resistors of different values interposed between said source of energy and each of said screen grids; said values being so chosen as to hold said bridge in substantial balance when light from said lamp to said cell is unobstructed, and a potentiometer at the juncture of said output legs operable to bring said bridge into exact balance prior to the insertion of said paper or the like between said lamp and said cell.

3. In an apparatus for determining the opacity of a paper or the like material from which a contact print is to be made, means affording connection of said apparatus with a source of electrical energy including a pair of leads, a lamp, a photocell positioned in close proximity to said lamp, a pair of screen grid tubes, means connecting the filaments of said tubes in series with each other across said leads, means connecting the screen grids of said tubes in parallel with one of said leads, means connecting the control grids of said tubes in series with the anode and cathode of said photocell and with a biasing battery interposed in series between one of said control grids and the cathode of said photocell, other leads interconnecting the plates of said tubes forming the output legs of an electrical bridge, resistors of different values interposed in series between said source of energy and each of said screen grids; said resistors being so chosen as to hold said bridge in substantial balance when light from said lamp to said cell is unobstructed, means connecting a meter in parallel with said output legs and a potentiometer interposed between the junctures of said output legs with said meter connecting means.

4. An apparatus for determining the light conducting qualities of paper, vellum or the like, from which a contact photo print is to be made, comprising two leads adapted to be connected to a source of direct current, a lamp connected in parallel across said leads, a photoelectric cell disposed in close proximity to said lamp for excitation thereby, a pair of screen grid thermionic tubes, means connecting the filaments of said tubes in series with each other and in parallel across said leads, means connecting the screen grids of said tubes in parallel with one of said leads, a resistor disposed in series between each of said screen grids and said one lead, means connecting the control grids of said tubes in series with the plate and cathode of said cell, means interconnecting the plates of said tubes forming the output legs of an electrical bridge, means including a potentiometer connecting said bridge to said one lead, means connecting a meter in parallel across said output legs, and control current output leads extending from said output legs for connection to adjusting means to be controlled by said apparatus.

5. An apparatus for determining the light conductive qualities of paper, vellum or the like, including a voltage regulator and a pair of leads extending therefrom, a lamp, a photoelectric cell positioned for excitation by light from said lamp, and a normally balanced electric bridge including a pair of thermionic tubes and means interconnecting the plates of said tubes to form the output legs of said bridge; means connecting said leads with said lamp, said cell and the filaments and grids of said tubes; said last named means including connections effective to cause any fluctuation in the power supply to said apparatus below the maximum voltage permitted by said voltage regulator to affect said lamp, cell filaments and grids uniformly and proportionately.

6. An apparatus for determining the light conductive qualities of paper, vellum or the like including, a voltage regulator, a pair of leads extending therefrom, a lamp, a photoelectric cell positioned for excitation by light from said lamp, a normally balanced electric bridge including a pair of thermionic tubes, means interconnecting the plates of said tubes to form the output legs of said bridge, means connecting said leads with said lamp, said cell and the filaments and grids of said tubes, said last named means including connections effective to cause any fluctuation in the power supply to said apparatus below the maximum voltage permitted by said voltage regulator to proportionately and uniformly affect said elements, and current output leads extending from said output legs for connection to printing machine control means.

7. An apparatus for determining the light conductive qualities of paper, vellum or the like from which a contact photo print is to be made, comprising a pair of leads adapted to be connected to a source of direct current, a lamp connected in parallel across said leads, a photocell disposed adjacent to said lamp for excitation by the light delivered by said lamp, an electrical bridge including a pair of thermionic tubes, means connecting the filaments of said tubes in series with each other across said leads, means connecting the plates of said tubes to form the output legs of said bridge, other means connecting the control grids of said tubes in series with the plate and cathode of said cell, and means including resistors of different values connecting said leads and the screen grids of each of said tubes; said resistors being so chosen as to maintain the output of said tubes in substantial balance when said cell is subjected to unobstructed light from said lamp.

8. An apparatus for determining the light conductive qualities of paper, vellum or the like from which a contact photo print is to be made, comprising a pair of leads adapted to be connected to a source of direct current; a lamp connected in parallel across said leads, a photocell disposed adjacent to said lamp for excitation by the light delivered by said lamp, an electrical bridge including a pair of screen grid thermionic tubes, means connecting the filaments of said tubes in series with each other across said leads, other means interconnecting the plates of said tubes to form the output legs of said bridge, means connecting the control grids of said tubes in series with the plate and cathode of said cell, and means connecting the screen grids of said tubes in parallel to one of said leads, including resistors of different values interposed between said one lead and each of said tubes; said resistors being so chosen as to maintain the output of said tubes in substantial balance when said cell is subjected to unobstructed light from said lamp.

9. An apparatus for determining the light conductive qualities of paper, vellum or the like from which a contact photo print is to be made, comprising a pair of leads adapted to be connected to a source of direct current, a lamp connected in parallel across said leads, a photocell disposed adjacent to said lamp for excitation by the light delivered by said lamp, an electrical bridge including a pair of thermionic tubes, means connecting the filaments of said tubes in series with each other and in parallel across said leads, means interconnecting the plates of said tubes connected to form the output legs of said bridge, means connecting control grids of said tubes in series with the plate and cathode of said cell, and means including a pair of resistors of dissimilar values effective to maintain the output of said tubes in substantial balance when said cell is subjected to unobstructed light from said lamp.

10. An apparatus for determining the light conductive qualities of paper, vellum or the like from which a contact photo print is to be made, comprising a pair of leads adapted to be connected to a source of direct current, a lamp connected in parallel across said leads, a photocell disposed adjacent to said lamp for excitation by the light delivered by said lamp, an electrical bridge including a pair of thermionic tubes, means connecting the filaments of said tubes in series with each other and in parallel across said leads, means interconnecting the plates of said tubes to form the output legs of said bridge, means connecting the control grids of said tubes in series with the plate and cathode of said cell, means including a pair of resistors of dissimilar values effective to maintain the output of said tubes in substantial balance when said cell is subjected to unobstructed light from said lamp, and a variable resistance means interposed in said interconnecting means operable to bring the output of said tubes exact balance.

11. An apparatus for determining the light conductive qualities of paper, vellum or the like from which a contact photo print is to be made, comprising a pair of leads adapted to be connected to a source of direct current, a lamp connected in parallel across said leads, a photocell disposed adjacent to said lamp for excitation by the light delivered by said lamp, an electrical bridge including a pair of thermionic tubes, means connecting the filaments of said tubes with each other and in parallel across said leads, means interconnecting the plates of said tubes to form the output legs of said bridge, means connecting the control grids of said tubes in series with the plate and cathode of said cell, fixed resistance means effective to maintain the output of said tubes in substantial balance when said cell is subjected to unobstructed light from said lamp, a variable resistance means interposed in said interconnecting means operable to bring the output of said tubes exact balance, and a meter connected in parallel with said variable resistance means.

GEORGE D. MACARTHUR.

REFERENCES CITED

The following references are of record in the file of this patent:

UNITED STATES PATENTS

| Number | Name | Date |
| --- | --- | --- |
| 1,762,748 | Smith | June 10, 1930 |
| 1,911,382 | Nelson | May 30, 1933 |
| 1,964,365 | Razek et al. | June 26, 1934 |
| 1,971,317 | Sheldon et al. | Aug. 21, 1934 |
| 2,158,903 | Knobel | May 16, 1939 |
| 2,222,429 | Briebrecher | Nov. 19, 1940 |
| 2,237,950 | Pineo | Apr. 8, 1941 |
| 2,411,440 | Le Page | Nov. 19, 1946 |
| 2,415,177 | Hurley | Feb. 4, 1947 |
| 2,424,858 | Senn | July 29, 1947 |
| 2,428,806 | Liben et al. | Oct. 14, 1947 |